W. W. THIEDE.
ROTARY VALVE FOR INTERNAL COMBUSTION ENGINES.
APPLICATION FILED JAN. 24, 1921.
1,403,721.
Patented Jan. 17, 1922.
3 SHEETS—SHEET 3.
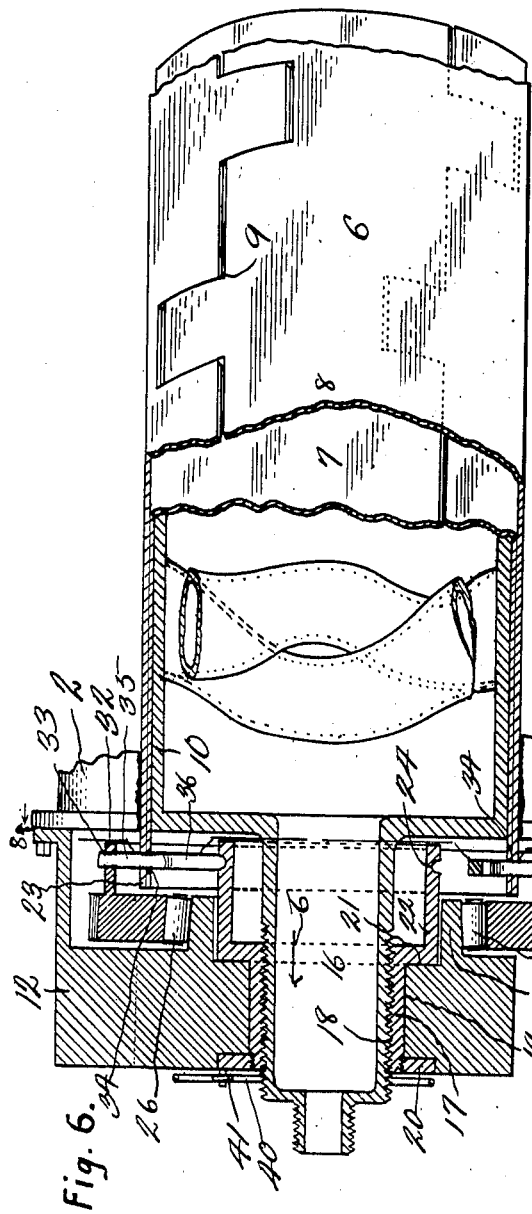
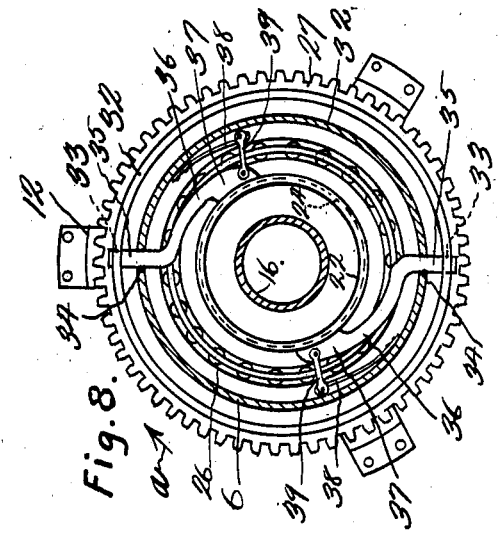
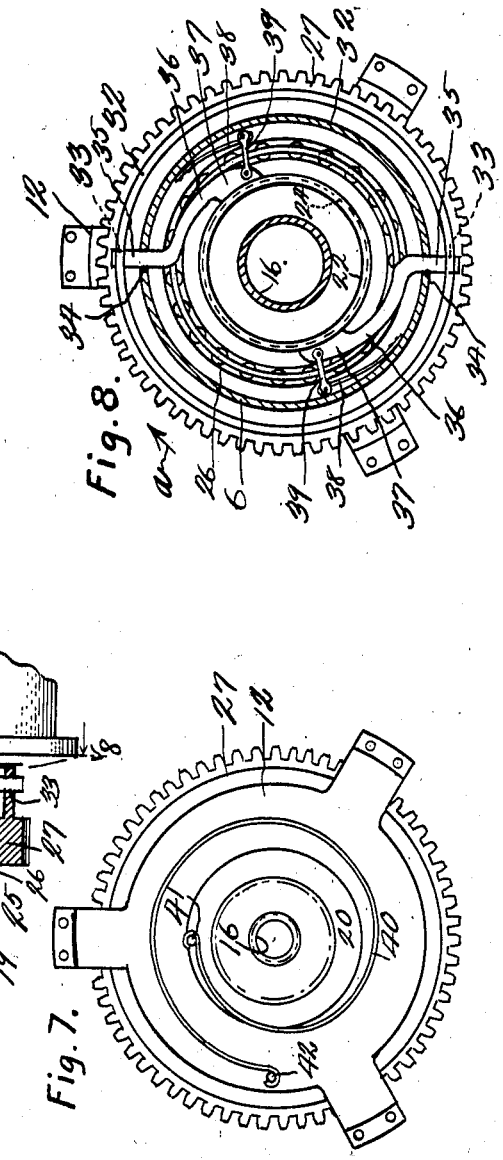
Walter W. Thiede
INVENTOR.
BY
Philip A. H. Sewell
ATTORNEY.

UNITED STATES PATENT OFFICE.

WALTER W. THIEDE, OF AMHERST, NEBRASKA.

ROTARY VALVE FOR INTERNAL-COMBUSTION ENGINES.

1,403,721.   Specification of Letters Patent.   Patented Jan. 17, 1922.

Application filed January 24, 1921. Serial No. 433,545.

*To all whom it may concern:*

Be it known that I, WALTER W. THIEDE, a citizen of the United States, residing at Amherst, in the county of Buffalo and State of Nebraska, have invented certain new and useful Improvements in Rotary Valves for Internal-Combustion Engines, of which the following is a specification, reference being had therein to the accompanying drawing.

The invention relates to rotary valves for internal combustion engines, and has for its object to provide a device of this character wherein a tapered valve sleeve is rotatably mounted in a tapered bore of a cylinder head and to provide means whereby a tapered casing which is normally stationary and on which the rotary valve rotates will be axially moved when the rotatable valve sleeve jams or is retarded in its rotation thereby breaking the jam of the rotatable valve sleeve which is split and contracts slightly. Also to provide spring means for normally holding the stationary tapered casing inwardly and for returning said stationary tapered casing to its normal position after the breaking of a jam of the rotatable valve sleeve.

A further object is to provide a tapered valve sleeve rotatably mounted in a tapered bore of a cylinder head and to provide an axially movable non-rotatable tapered casing on which the rotatable sleeve rotates, said casing being supported in brackets at its ends, one of the ends of said axially movable casing having threaded thereon, a flanged sleeve, said sleeve having its flange provided with a clutch groove, with which groove clutch elements co-operate, said clutch elements being normally held out of engagement with said groove by springs and having extensions extending through the rotary valve sleeve and the flange of a rotatable roller bearing supported gear which is rotated from the crank shaft of the engine. Also to provide spring means whereby after the rotatable valve sleeve has been retarded during a sticking of the sleeve and the clutch members thrown into engagement with the flange of the flanged sleeve and the flanged sleeve moved in its bearing in its supporting bracket, for moving the inner tapered cylindrical casing, said inner tapered cylindrical casing will again move inwardly to its normal position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 6 is an enlarged view partly in section and partly in elevation of one end of the rotary valve mechanism.

Figure 7 is an end view of the rotary valve mechanism, showing the spring for returning and normally holding the cylindrical tapered casing on which the rotary valve sleeve rotates inwardly.

Figure 8 is a sectional view taken on line 8—8 of Figure 6.

Figure 1:
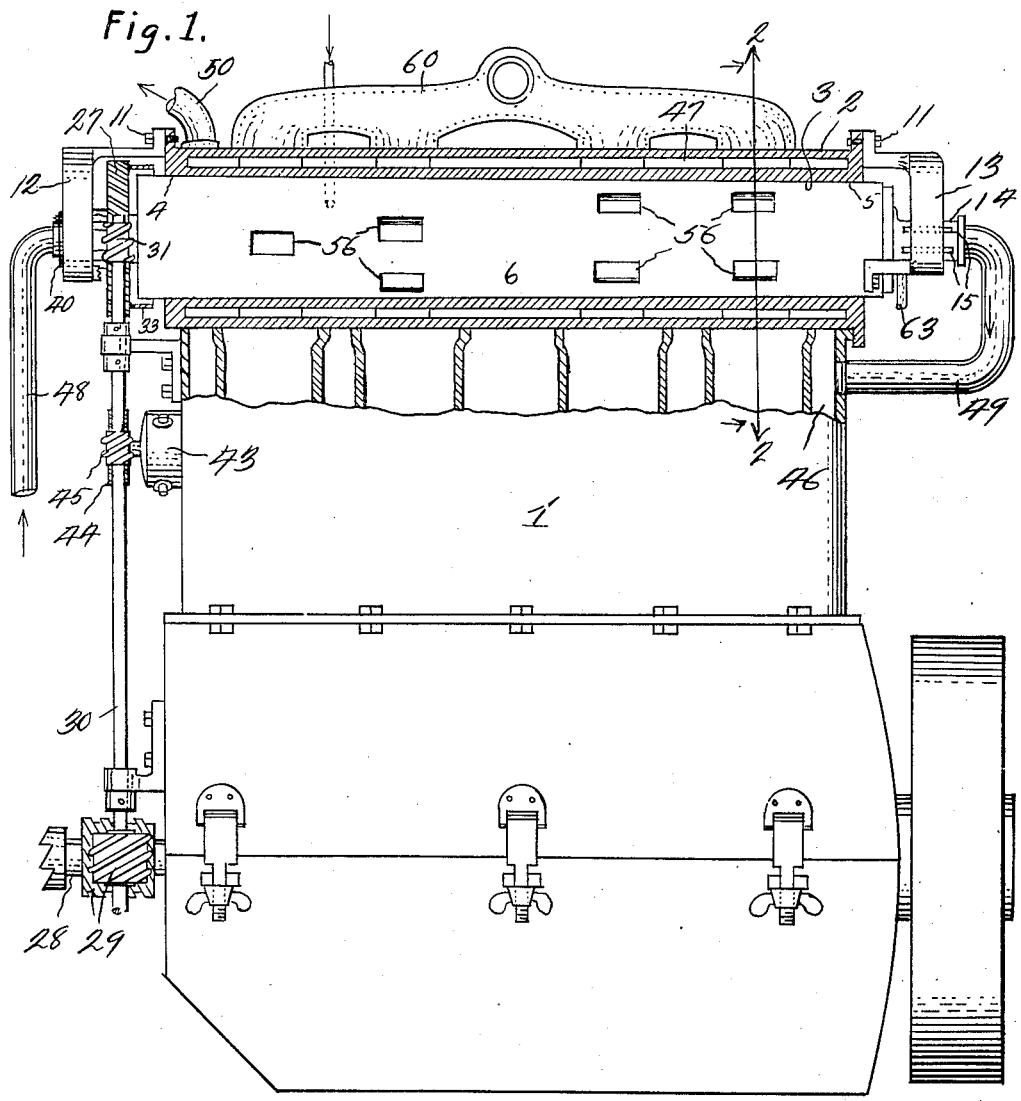
Figure 1 is a side elevation of the engine, partly in elevation and partly in section, and showing the valve mechanism applied thereto.

Referring to the drawings, the numeral 1 designates the block of a conventional form of internal combustion engine, and 2 a cylinder head carried thereby. The cylinder-head 2 is provided with a tapered horizontally disposed bore 3 which tapers from its end 4 to its end 5. Rotatably mounted in the tapered bore 3 is a rotatable valve sleeve 6 which is correspondingly tapered. Valve sleeve 6 is preferably built up from telescopical sleeves 7 and 8, which sleeves are provided with interlocked or interengaged scallops 9, which scallops allow contraction of the valve sleeve 6 as a whole. Disposed within the valve sleeve 6 is a nonrotatable tapered sleeve 10 correspondingly tapered as the inner periphery of the valve sleeve 6 and on the outer periphery of which the valve sleeve 6 rotates. Secured to the ends of the cylinder head 2 by means of bolts 11 are supporting brackets 12 and 13 for supporting the tapered casing 10, said casing 10 having a hollow extension 14 at one of its ends, which extension is slidably mounted in the bracket 13 on the keys 15, the other end of the stationary casing 10 is provided with a hollow extension 16 and on said hollow extension 16, a rotatable sleeve 17 is threaded as at 18, said rotatable sleeve being rotatably mounted in a bearing 19 of the bracket 12, and prevented from axial movement in said bearing 19 by means of a removable ring 20 carried by the sleeve and the shoulder 21 of the sleeve. Threaded sleeve 17 at its inner end is provided with an annular flange 22, which extends into the end 23 of the rotary valve sleeve 6 and adjacent its end is provided with a clutch groove 24, with which groove, clutches hereinafter set forth cooperate.

Extending inwardly from the inner face of the bracket 12 and surrounding the flange 22 of the threaded sleeve 17 is an annular flange 25, the outer periphery of which forms a raceway for roller bearings 26. Supported on the roller bearings 26 is a gear ring 27, which revolves on said roller bearing 26. The gear ring is rotated from the crank shaft 28 of the engine through the medium of the worms 29, shaft 30, and worm 31, which meshes with the gear ring 27. Said worms and gear ring are preferably proportioned so that there will be a one to eight speed of rotation of the crank shaft and valve sleeve 6. Extending inwardly from the inner face of the gear ring 27 and overlying the end 23 of the rotatable sleeve 6 is a flange 32 and through apertures 33 in said flange and apertures 34 in the end 23 of rotatable sleeve 6 the arms 35 of clutches 36 extend. Clutches 36 have their ends 37 disposed in the same transverse vertical plane as the clutch groove 24, but out of frictional engagement therewith and are normally held out of frictional engagement therewith by means of leaf springs 38 which have link connections 39 with the ends 37 of the clutches 36.

It has been found that where a tapered valve is utilized, that incident to the varying heat and the degree of taper that the valve sleeve 6 becomes stuck or retarded during the operation of the engine in the tapered bore 3. By providing the mechanism set forth above, it will be seen that when the gear ring 27 is rotating in the direction of the arrow $a$ under normal conditions where there is no retarding of the valve sleeve 6 that said valve sleeve will simultaneously move with the gear ring 27. However, if the valve sleeve 6 is retarded it will hold back on the inner ends of the arms 35 of the clutch members thereby throwing the groove engaging members 37 into clutch engagement with the flange 22 of the sleeve 17 thereby causing said sleeve 17 to rotate in its bearing 19 in the bracket 12. This action will cause an axial movement of the cylindrical casing 10 in the direction of the arrow $b$ thereby allowing the valve sleeve 6 to slightly contract for breaking the jam. When the jam has been broken, it will be seen that the threaded sleeve 17 will again be moved inwardly to its normal position by the spiral spring 40, one end of which is connected as at 41 to the threaded sleeve 17 and the other end 42 to the bracket 12.

The commutator 43 is provided with a worm gear 44, which gear may be driven by a worm gear 45 carried by the vertical shaft 30. Surrounding the cylinders of the engine are water chambers 46, which water chambers are in communication with water chambers 47 of the cylinder head, water entering the chamber of the cylindrical casing 10 through the pipe 48 which leads to the radiator, then passing longitudinally through the chamber of the casing 10; thence through the pipe 49 to the water chamber 46 and passing outwardly back to the radiator through the pipe 50.

Figure 2:
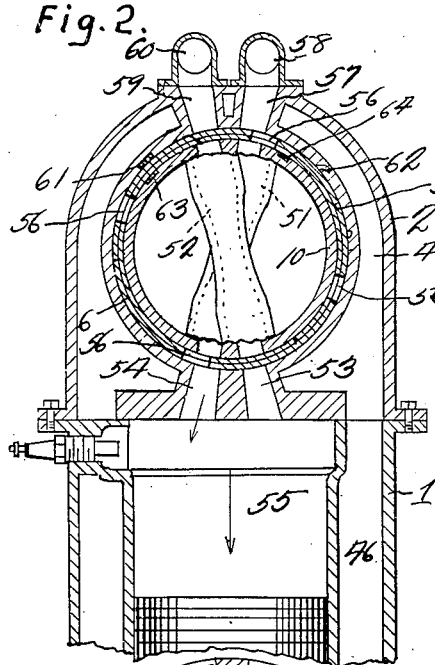
Figure 2 is a vertical sectional view through the cylinder head taken on line 2—2 of Figure 1, showing the position of the valve during an intake stroke.
Figure 3:
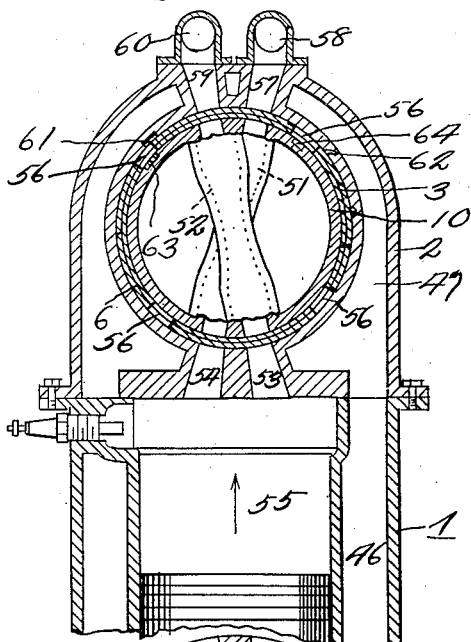
Figure 3 is a view similar to Figure 2 showing the position of the valve on the compression stroke.
Figure 4:
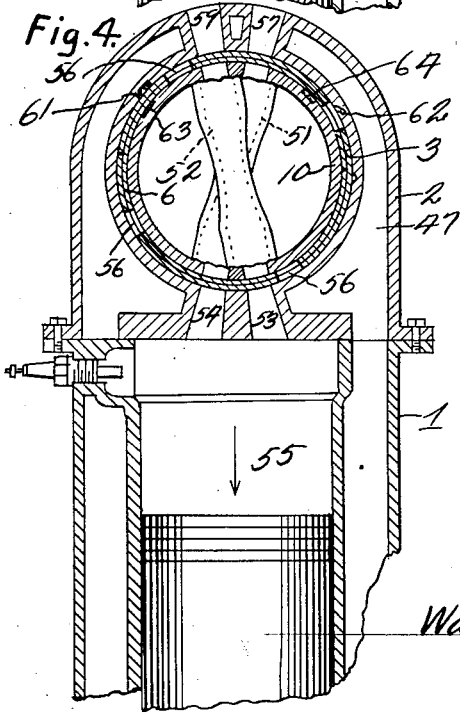
Figure 4 is a sectional view through the valve and cylinder head, showing the position of valve on the explosion stroke.
Figure 5:
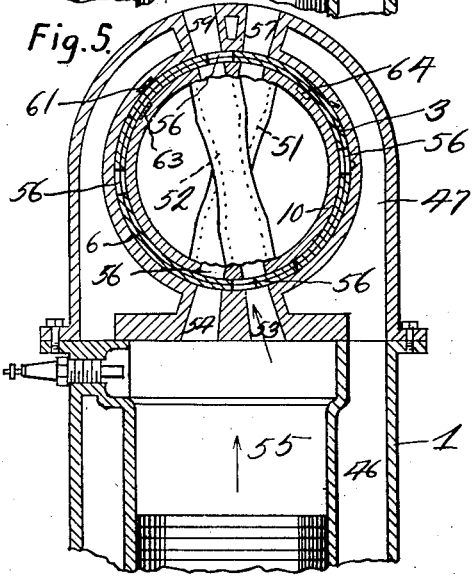
Figure 5 is a sectional view through the cylinder head and valve, showing the position of the rotary valve on the exhaust stroke.

By referring to Figures 2 to 5 inclusive, it will be seen that the stationary cylindrical casing 10 is provided with diametrically disposed intake passages 51 and exhaust passages 52, which intake and exhaust passages at their lower end terminate above ports 53 and 54, which are in communication with combustion chamber 55 of the cylinders of the engine. The rotary valve sleeve immediately above each cylinder is provided with four substantially equally spaced ports 56 which alternately register with the intake ports 57 which are in communication with the intake manifold 58 and the passages 54 which are in communication with the combustion chamber 55 and the exhaust ports 59 which are in communication with the exhaust manifold 60, and the exhaust passages 53 which are in communication with the combustion chambers 55. It will be seen that cycles of operation will be accomplished.

The rotating valve sleeve 6 is lubricated on its outer periphery by an oil pad 61, the excess lubricant being drained off in the lubricant drain channel 62, which is drained in any suitable manner by a pipe 63. The inner periphery of the sleeve valve 6 is lubricated by a longitudinal disposed lubricated pad 63 to which lubricant may be supplied in any suitable manner and excess lubricant may be drained off through the longitudinally disposed drain channel 64.

From the above it will be seen that a rotary sleeve valve mechanism for internal combustion engines is provided, which sleeve valve will be prevented from becoming stuck in the bearing of a cylinder head, and one wherein the operation is positive and the parts reduced to a minimum.

The invention having been set forth what I claim as new and useful is:

A rotary valve mechanism for internal combustion engines, said mechanism comprising a rotatable sleeve longitudinally split and rotatably mounted in the bore of a cylinder head, said rotatable valve sleeve being rotatably mounted on an axially non-rotatable casing, said non-rotatable casing having its ends provided with extensions extending beyond the valve sleeve, one of said extensions being mounted for axial movement in the bearing of a bracket, the other end of said non-rotatable casing having its end threaded and provided with a flanged sleeve, said flanged sleeve being rotatably mounted in a stationary bracket, a gear ring carried by said bracket and provided with a flange overlying one end of the valve sleeve, a flange carried by the sleeve threaded on the end of the axially movable cylindrical casing, clutch members interposed between the flange of the threaded sleeve and the inner periphery of one end of the sleeve valve, said clutch members having arms extending through registering apertures in the gear ring flange and the end of the sleeve valve, means for normally holding said clutch members out of engagement with the threaded sleeve and means whereby upon a retarded movement of the valve sleeve said clutch members will be thrown into engagement with the threaded sleeve, thereby rotating the same and moving the stationary cylindrical casing axially, and a spring connected to the threaded sleeve and to the sleeve supporting bracket and forming means for restoring the cylindrical casing to normal position when the cause of retardation of the rotatable sleeve is removed.

In testimony whereof I hereunto affix my signature.

WALTER W. THIEDE.